United States Patent
Malmquist et al.

(10) Patent No.: US 6,813,885 B2
(45) Date of Patent: Nov. 9, 2004

(54) ELECTROHYDRAULIC SETTING DEVICE

(75) Inventors: Anders Malmquist, Täby (SE); Peter Kjellquist, Mölnbo (SE)

(73) Assignee: Saab AB, Linkoping (SE)

( * ) Notice: Subject to any disclaimer, the term of this patent is extended or adjusted under 35 U.S.C. 154(b) by 108 days.

(21) Appl. No.: 10/257,282
(22) PCT Filed: Mar. 1, 2001
(86) PCT No.: PCT/SE01/00436
§ 371 (c)(1),
(2), (4) Date: Feb. 11, 2003
(87) PCT Pub. No.: WO01/77531
PCT Pub. Date: Oct. 18, 2001

(65) Prior Publication Data
US 2003/0156948 A1 Aug. 21, 2003

(30) Foreign Application Priority Data
Apr. 11, 2000 (SE) .............................. 0001333

(51) Int. Cl.[7] .................................................. F16B 7/00
(52) U.S. Cl. .............................. 60/325; 60/476; 60/545; 417/417; 417/418; 137/625.22
(58) Field of Search .......................... 60/325, 476, 545; 417/417, 418; 137/625.22

(56) References Cited

U.S. PATENT DOCUMENTS

| | | | |
|---|---|---|---|
| 1,804,375 A | | 5/1931 | Cobe |
| 3,754,154 A | | 8/1973 | Massie |
| 4,799,421 A | * | 1/1989 | Bremer et al. ................. 60/517 |
| 4,965,864 A | * | 10/1990 | Roth et al. ................... 417/418 |
| 5,166,563 A | * | 11/1992 | Bassine ...................... 417/417 |
| 5,203,172 A | | 4/1993 | Simpson et al. |
| 5,727,388 A | | 3/1998 | Adamides |

FOREIGN PATENT DOCUMENTS

JP        04027773 A  *  1/1992  ........... F04B/17/04

* cited by examiner

Primary Examiner—Edward K. Look
Assistant Examiner—Igor Kershteyn
(74) Attorney, Agent, or Firm—Swidler Berlin Shereff Friedman, LLP

(57) ABSTRACT

An actuating device (1) for carrying out mechanical work by means of a slave piston rod (5) in a hydraulically-operated slave cylinder (2), where the actuating device (1) is made up of a hydraulic pump (3) integrated with a slave cylinder (2) and where the hydraulic pump (3) is driven by a linear electric motor, which consists of a pump piston (7) which is used as rotor in the linear motor at the same time as the pump piston (7) functions as a pumping piston in the hydraulic pump (3) to build up a hydraulic pressure in the slave cylinder (2).

10 Claims, 2 Drawing Sheets

ELECTROHYDRAULIC SETTING DEVICE

TECHNICAL FIELD

The invention in question concerns an actuating device, consisting of a hydraulic slave-cylinder integrated with a hydraulic pump, which with the assistance of a linear electric motor drives the pump piston in a reciprocating motion within a pump cylinder thereby building up hydraulic pressure to the level desired for driving a piston in the slave cylinder, thus enabling a piston rod connected to the piston in the slave cylinder to execute mechanical work.

STATE OF THE ART

Linear hydraulic actuators are used today in, for example, the aircraft industry, where they are used for manoeuvring flight control surfaces such as ailerons. The type of actuator referred to here is also used in railway construction, for example for tilting railway wagon bodies through curves. There are of course numerous other applications found in a range of technological areas. Applications within the aircraft industry have been used in this document to describe the current technology along with its possible limitations. For example, aircraft require a number of operational arms, which with the huge forces necessary manoeuvre their control surfaces for executing, for example, changes in flight paths and landings. Normally these structures used for manoeuvring aircraft are constructed using hydraulic cylinders, which by means of transferring a desired pressure through fluid in hydraulic lines bring about the manoeuvring of the control surfaces to predetermined positions. Hydraulic cylinders are preferable in these situations where great actuating forces may be required. However the use of numerous hydraulic slave cylinders distributed throughout an aircraft requires the installation of a large, central hydraulic system. Lines for carrying hydraulic fluid have to be run to each individual hydraulic manoeuvring device. All in all, this means that rather complicated hydraulic systems must be fitted onboard aircraft. Lengthy and numerous hydraulic lines have to be run along the aircraft fuselage and wings. Redundant systems have to be fitted to combat any drop in hydraulic pressure somewhere in the system, so that the manoeuvrability of the plane is not jeopardised. Having hydraulic lines running throughout an aircraft increases the risk of fire, as hydraulic fluid may leak into sensitive areas. The hydraulic system accounts for an increase in the total weight of the aircraft, which could be reduced if alternative technology was available. Moreover, hydraulic systems are expensive and increase the probability of failure. Serviceability is also reduced since the hydraulic system is distributed throughout the craft, where certain parts can be difficult to replace. Perhaps the greatest weakness of hydraulic systems in this context is the difficulty encountered actually installing hydraulic manoeuvring systems of the type mentioned here within aircraft or for that matter any sort of technical machine. There is a desire within the industry today to replace the central hydraulic system with an electrical system. This has not been possible yet, as actuators suitable for these purposes are not yet available.

DESCRIPTION OF THE INVENTION

In accordance with the invention, an electrohydraulic actuating device is presented, consisting of a hydraulic slave cylinder containing a piston that pushes a piston rod and which receives its pressure for building up this piston-derived power via its integration with a hydraulic pump, which is in turn is driven by a linear electric motor.

The hydraulic pump consists of a pump cylinder in which a piston slides at a specified frequency in a reciprocating motion within the pump cylinder. The piston's motion is controlled through its functioning as the rotor for the linear electronic motor, with the motor's stator coil being wound around the pump cylinder itself. Moreover, the piston functions as a pump piston for pumping hydraulic fluid to the slave cylinder. An additional feature is that the piston also functions as a valve for opening and closing compression and suction ducts for carrying hydraulic fluid to and from the slave cylinder during the piston's reciprocating motion. By pumping hydraulic fluid at a high frequency, high pressure can be built up and great force exerted on the slave piston in the cylinder, even when the hydraulic pump is small.

At each end of the pump cylinder there is a coil that together act to rotate the piston a half rotation around the pump cylinder's central axis. This ensures that the functioning of the hydraulic-fluid filled suction and compression ducts linking the pump cylinder and the slave cylinder is not disrupted with every stroke of the pump piston, due to the change in stroke direction with every new stroke. For this reason, the compression ducts have at least two outlets, and the suction ducts at least two inlets. Due to the way the piston functions as a valve as it rotates a half revolution round its central axis, a first opening into the compression duct, which functions as an outlet during the pistons motion in a first direction, will be closed by the piston's movement in a second direction, at the same time as a second opening into the compression duct opens, and functions as a second outlet. Correspondingly, due to the way the piston functions as a valve as it rotates a half revolution round its central axis, there is a first opening into the suction duct, which functions as an inlet during the piston's motion in a first direction, and will be closed by the piston's movement in a second direction, at the same time as a second opening into the suction duct opens, and functions as a second inlet. In this way the strokes of the pump piston work together to build up the desired hydraulic pressure on one side of the slave piston in the slave cylinder regardless of the direction of the pump stroke. The rotating of the pump piston by means of the coils at the ends of the pump cylinder works essentially the same way as a stepping motor. In principle, a number of inlet and outlet ducts can be distributed around the pump cylinder's periphery in a regular arrangement, for example at 120° intervals, with the piston cavities aligned according to the distribution of ducts, which would in this case mean that the piston would only have to advance a third of a rotation with every stroke.

Because of the high working frequency and the large ratio between the cross-sectional area of the piston in the slave cylinder and the cross-sectional area of the piston in the pump, a high exchange of power can be achieved between the pump and the slave piston. This enables great actuating forces to be achieved from a very spatially economic and weight-effective manoeuvring device in the form of the actuating device being described here. As a result of this, it would be possible to achieve a distributed system of local hydraulic actuators, in a set-up such as a craft, for manoeuvring mechanical elements in a craft, where the actuators are driven and controlled electrically. Consequently, the need for a network of hydraulic lines and central hydraulic systems characteristic of current technology previously mentioned could be done away with.

In those applications where a mechanical element, for example an aileron, manoeuvred by an actuator is affected by other external forces so that the element is forced back to a neutral position, these external forces can be utilised for regeneratively re-supplying the power back to the actuator's electrical supply. This would reduce the cooling requirements of the hydraulic fluid in the actuator, thus contributing to the energy efficiency of the set-up.

The linear motor's principal coil, that is the stator coil, may consist of a simple coil, though it is advantageous to use multi-phase winding. This can make it easier to steer the forces during the piston stroke in each respective direction, and therefore facilitate optimisation of the actuator's efficiency.

The winding current is controlled by a static converter, preferably integrated with the hydraulic pump, for example along the lines of the well-known integral motor concept.

In those cases where it is desired that the slave piston rod in the actuator moves in the opposite direction to that described above, this can be easily achieved by having the pump piston position around the central axle work in reverse phase, i.e. that if the pump piston with its movement in one direction has a rotational position v while working to drive the rod outward from the slave cylinder, then the piston's action with movement in the same direction but with the piston rotation position advanced to v+ the rotation interval (depending on how the inlet and outlet ducts are distributed around the pump cylinder), will bring about pump work where the slave piston rod is forced inwards into the slave cylinder instead of outwards.

DESCRIPTION OF THE EMBODIMENTS

A number of embodiments of the invention are described in the following section with the aid of the accompanying drawings.

Figure 1:
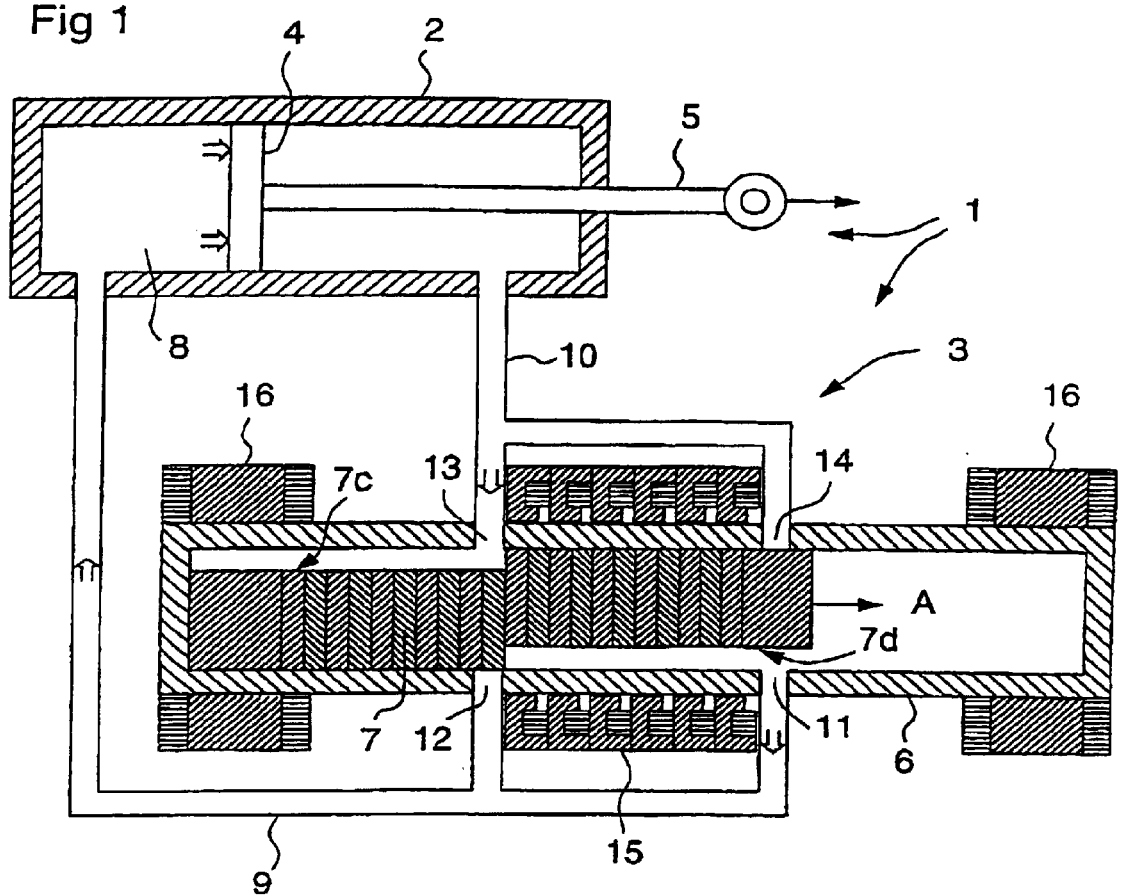
FIG. 1 shows schematically a section through the actuating device with its slave cylinder and the hydraulic pump
Figure 1A:
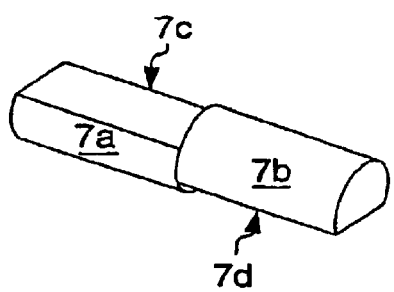
FIGS. 1a and 1b show schematically the shape of the slave piston.
Figure 1B:
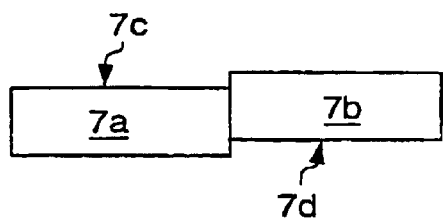

FIG. 1 shows an electrohydraulic actuating device 1 consisting of a hydraulic slave cylinder 2 and a hydraulic pump 3, where the hydraulic pump 3 is utilised for producing pressure in the slave cylinder 2, and via the desired force exerted on the slave piston 4 drive the slave piston 4 and thus the slave piston rod 5 in the desired direction outward or inward into the slave cylinder 2, enabling the slave piston rod to produce the desired work on a mechanical device. The slave piston rod 5 can for example effect movement in a control surface, when the rod is connected to such a control surface in a sea or air craft.

The actuating device 1 is constructed around a cylinder, which we have called the pump cylinder 6. The pump cylinder 6 houses a pump piston 7 and hydraulic fluid 8. The pump piston is cylinder—like in shape, with the first half, along its long axis 7a, of the piston's enveloping surface flattened to produce the "first" flat surface 7c, and the second half, along its long axis 7a, of the piston's enveloping surface flattened to form the "second" flat surface 7d, rotated 180° to the plane of the first flat surface 7c, and can be seen in FIG. 1. The pump piston 7 moves back and forth in the pump cylinder 6 in the first direction A and in the second direction B. Between the pump cylinder 6 and one side of the slave cylinder 2 runs a compression duct 9, and between the pump cylinder 6 and the other side of the slave cylinder 2 there is a suction duct 10, where the compression duct 9 and the suction duct 10 of course open onto opposite sides of the slave piston 4. The compression duct 9 is connected to the pump cylinder's 6 internal space via the "first") outlet 11 and the "second" outlet 12, so that the first outlet 11 opens onto the piston's second half of the piston's length 7a, while the second outlet 12 opens onto the first half of the piston's length 7a. The suction duct 10 is in a corresponding way connected to a "first" inlet 13 and a "second" inlet 14 into the pump cylinder 6, so that the first inlet 13 opens onto the first half of the piston's length 7a, while the second inlet opens onto the second half of the piston's length 7a. The pump piston 7 functions as a double-action piston, whereby the pump piston via its reciprocating motion within the pump cylinder 6 drives the hydraulic fluid 8 out through one of the outlets (11 or 12) at the same time as it sucks the hydraulic fluid in through one of the inlets (13 or 14).

As mentioned earlier, the double-action piston, the pump piston 7, also constitutes the rotor in the linear electric motor, and the motor's stator in the example provided has a stator coil 15 wound around the pump cylinder 6. The stator coil can be single or multi-phased. A multi-phased winding arrangement has some advantages. For example, it facilitates management of both the compression pulsation and the sound level as well as optimising the efficiency with respect to current losses. It is preferable for the frequency of the motor to lie somewhere in the interval of 100 Hz–1000 Hz or even higher.

The rotation of the piston a half turn at the end of each piston stroke is achieved using a coil 16 located at each end of the pump cylinder 6. The coil 16 has essentially the same function as a stepping motor, where the coil has an excitation winding for achieving rotation of the piston 7, so that it turns in steps of 180° between each piston stroke. The excitation winding in the coil 16 can be separate (as shown here), though an alternative is to construct and control the primary coil, referred to above as the stator coil, in such a way that the rotation step in the piston can be achieved by means of this control.

The principle for the pump movement is shown diagrammatically in the series, FIGS. 1 and 2a–2c. In FIG. 1, the function and operation of the actuating device 1 is shown when the pump movement is such that the hydraulic fluid pushes the slave piston 4 and its piston rod 5 out of the slave cylinder 2. In this case, the pump piston 7 is about to align in the first direction A, while the pump piston 7 lies in such a rotational position that the hydraulic fluid is pushed out of the pump piston 7 through the first outlet 11 into the compression duct 9 and applies pressure to the slave piston 4 on its left side as seen in the picture. The second outlet 12 is held closed during this stroke by the pump piston. At the same time, hydraulic fluid 8 is sucked out, during this stroke, from the slave cylinder on the slave piston's right side as shown in the picture, by the fluid being sucked through the first inlet 13, due to expansion of the fluid space that the inlet 13 comes in contact with in the pump cylinder 6 when the piston moves into the first direction A. The second inlet 14 is held closed during this stroke by the pump piston.

Figure 2A:
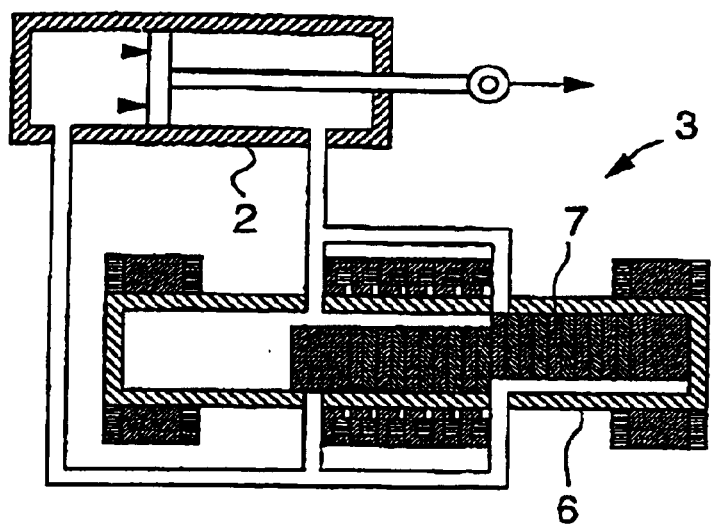
FIGS. 2a–2c are a series of drawings illustrating the operation of the hydraulic pump at various piston stroke positions.
Figure 2B:
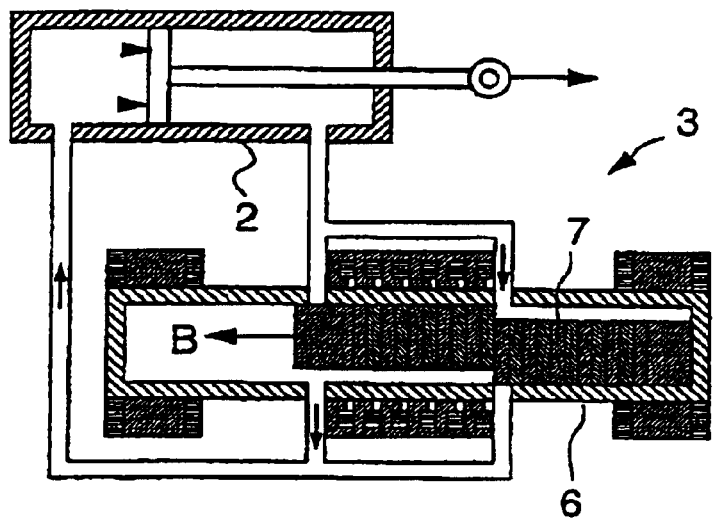
Figure 2C:
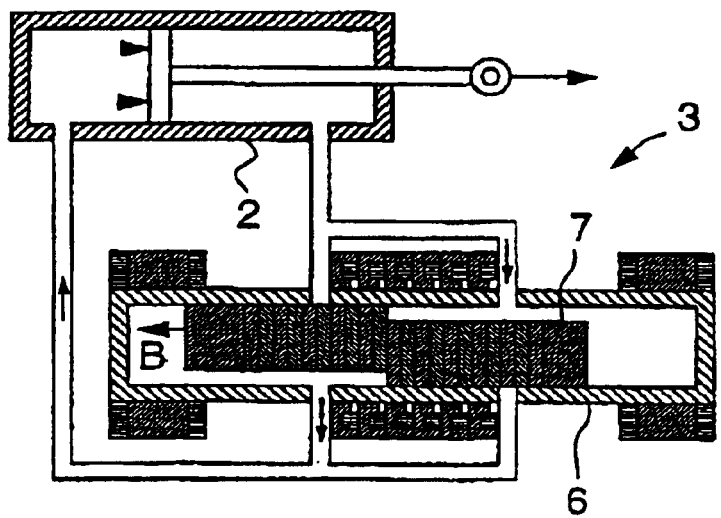

In FIG. 2a the pump piston 7 has reached the return point after the first stroke described by FIG. 1. In this position, the pump piston is then rotated through 180°, and is shown in FIG. 2b. The angle position for the cavities that are created between the piston's flat surfaces (7c and 7d respectively) and the pump cylinder wall is rotated 180°. This means that the previously closed inlets and outlets, the second outlet 12 and the second inlet 14, open into the above mentioned cavities, while those opened during the first stroke, the first outlet 11 and the first inlet 13, are now closed. In this way, during the pump piston stroke occurring in the second direction B, hydraulic fluid will still be sent through the compression duct 9 via the second outlet 12, and hydraulic fluid will be sucked from the slave cylinder via the suction duct 10 through the second inlet 14, which is shown in FIGS. 2b and 2c. When the pump piston reaches the maximum position at the end of the stroke in the second direction B, the piston is again rotated under the control of the stepping motor in the form of the coil 16, whereby a new stroke in the direction A will recommence as described above.

If it is envisaged that the manner of operation should be the reverse, that is that the pump movement should drive the slave piston 4 and its piston rod 5 inward into the slave cylinder 2, then the coil 16 is controlled in such a way that, with respect to the piston's rotational position, the pump piston works in reverse phase to that shown in the figure sequence, 1 and 2a–2c. Thus, the pump will function, in all the figures, in a way that is opposite to what has been described above. The compression duct 9 will instead work as a suction duct, while the suction duct 10 will act as a compression duct, which will be obvious from a study of the operational procedure in the figure series 1 and 2a–2c, when the rotational position for the pump piston is advanced 180° in relation to what has been shown and described above with respect to the series of figures. In the example shown in the figures, only one embodiment has been shown, with its ducts distributed with a spread of 180° around the pump cylinder periphery. As mentioned above, it is fully possible to utilise several inlet and outlet ducts distributed for example at 120°, 90° or 60° intervals, and where the pump piston advances stepwise according to the angle corresponding to the angle interval used.

It is possible to use an arrangement with moveable valves at the inlets and outlets instead of a rotating piston, but the idea with this invention is to utilise as few moving parts as possible by taking advantage of the piston as a valve body.

What is claimed is:

1. An actuating device (1) for execution of mechanical work by means of a piston rod (5) in a hydraulically-operated slave cylinder (2), characterised in that the actuating device (1) is made up of a hydraulic pump (3) integrated with a slave cylinder (2), that the hydraulic pump (3) is driven by a linear electric motor, where a pump piston (7) used as a rotor in the linear motor also functions as a pump piston in the hydraulic pump (3) for building up a hydraulic pressure in the slave cylinder (2) and in that the pump piston (7) is rotated a predetermined part of a rotation after every complete pump stroke.

2. An actuating device (1) as in claim 1, characterised in that the hydraulic pump (3) contains a pump cylinder (6) that houses a pump piston (7) and a hydraulic fluid (8), where the electric motor has a stator coil (15) arranged around the pump cylinder (6), whereby the pump piston (7) controlled by the stator coil with selectable pump frequency in a reciprocating linear movement pumps the hydraulic fluid (8) to and from the slave cylinder (2).

3. An actuating device (1) as in claim 2 for achieving hydraulic pressure in hydraulic fluid (8) for, via a compression duct (9) and a suction duct (10), between the hydraulic pump (3) and the slave cylinder (2), by means of a force transferred by the hydraulic fluid (8) in the said ducts (9, 10), driving a piston (4) in the slave cylinder (2) in the first direction, characterised in that the pump piston (7) with its movement constitutes a valve body for opening and closing at least one compression valve and suction valve in the pump cylinder, so that the compression duct (9) and suction duct (10) have the same function regardless of the direction of movement of the pump piston (7) as long as the slave piston (4) is moved in the first direction.

4. An actuating device (1) as in claim 1, characterised in that having a stepping motor at each end of the pump cylinder (6) controls the rotation of the piston (7).

5. An actuating device (1) as in claim 4, characterised in that the stepping motor consists of an electric coil (16) with an excitation winding for creating the said rotation.

6. An actuating device (1) as in claim 2, characterised in that the pump has a frequency in the interval 100 Hz to 1000 Hz.

7. An actuating device (1) as in claim 3, characterised in that the slave piston (4), and therefore the slave piston rod (5) in the slave cylinder (2), is able to be moved in the second direction, by having the pump piston (7) work in the reverse phase, which means that the pump piston's (7) angle position for a given position along the long axis and pump direction in the pump cylinder (6) is advanced by a half rotation compared with the piston's angle position for the same position along the long axis of the pump and pump direction when the slave piston (4) is moved in the first direction.

8. An actuating device (1) as in claim 2, characterised in that the stator coil (15) current is controlled by a static converter integrated into the linear motor.

9. An actuating device (1) as in claim 2, characterised in that the stator coil (15) is single or multi-phased.

10. Method for executing mechanical work by means of a slave piston rod (5) in a hydraulically-operated slave cylinder (2), where a hydraulic pump (3) is integrated with a slave cylinder (2), characterised in the steps:

a linear electric motor drives a pump piston (7) in a hydraulic pump (3) to execute strokes in a reciprocating motion, the pump piston (7), which at the same time functions as a rotor in the linear motor, also pumps a hydraulic fluid (8) to and from the slave cylinder (2) with every stroke, and the pump piston (7) is advanced a predetermined part of a rotation with every stroke.

* * * * *